United States Patent [19]

Huang

[11] Patent Number: 4,883,886

[45] Date of Patent: Nov. 28, 1989

[54] PROCESS FOR MANUFACTURING POLYALKENYL SUCCINIC ANHYDRIDES

[75] Inventor: Chente Huang, Naperville, Ill.

[73] Assignee: Amoco Corporation, Chicago, Ill.

[21] Appl. No.: 143,760

[22] Filed: Jan. 14, 1988

[51] Int. Cl.$^4$ ............................................. C07D 307/60
[52] U.S. Cl. ...................................... 549/255; 549/232
[58] Field of Search ................................. 549/255, 232

[56] References Cited

U.S. PATENT DOCUMENTS

| | | | |
|---|---|---|---|
| 3,912,764 | 10/1978 | Palmer, Jr. | 549/255 |
| 4,110,349 | 8/1978 | Cohen | 549/255 |
| 4,414,397 | 11/1983 | Powell | 549/255 |
| 4,496,746 | 1/1985 | Powell | 549/231 |

Primary Examiner—Mary C. Lee
Assistant Examiner—Bernard I. Dentz
Attorney, Agent, or Firm—Matthew R. Hooper; William H. Magidson; Ralph C. Medhurst

[57] ABSTRACT

A process in which a polymer of a $C_2$–$C_8$ olefin having a number average molecular weight of about 250 and 30,000 undergoes reaction with an unsaturated aliphatic dicarboxylic acid anhydride in two stages in the presence of 5–500 ppm, based on said polymer, of a tar and side product suppressing agent to form an alkenyl substituted anhydride, said process having a first stage comprising the following steps: (1) charging to a reaction zone said olefin polymer; (2) heating same to a reaction temperature of about 150° C. to about 300° C.; (3) charging about 30 to about 60 weight percent of the total amount of tar and side product suppressing agent intended for use in the reaction; (4) charging said anhydride to the heated reaction zone gradually over a period of about 1 to 3 hours and in an amount in the range of about 50 to about 75 weight percent of the total amount of anhydride intended for the reaction while maintaining said reaction temperature; and (5) allowing the reaction of the anhydride and polymer to proceed at said reaction temperature for a period of about 2 to 7 hours following completion of said anhydride addition, followed by a second state comprising the steps of: (1) charging the remaining tar and side product suppressing agent to the reaction zone; (2) charging the remaining anhydride to the reaction zone gradually over a 1 to 3 hour period; and (3) allowing the reaction of the anhydride and polymer to proceed to completion.

3 Claims, No Drawings

PROCESS FOR MANUFACTURING POLYALKENYL SUCCINIC ANHYDRIDES

BACKGROUND OF THE INVENTION

1. Field of the Invention

The present invention relates generally to the preparation of alkenyl-substituted intramolecular anhydrides of aliphatic dicarboxylic acids in the presence of catalysts or agents such as 1,3-dibromo-5,5 dialkylhydantion which decrease unwanted by-product formation. More particularly, the invention is directed to a thermal process for preparing polyalkenyl-substituted anhydrides by reacting a polyalkene with an unsaturated aliphatic dicarboxylic acid anhydride in a reaction zone in the presence of a tar and side product suppressing agent, wherein the process comprises the step of adding the anhydride reactant and the tar and side product suppressing agent to the reaction zone in a plurality of stages to suppress formation of tar and other undesired side products.

2. Discussion of the Prior Art

Viscous polyalkenes having number average molecular weights of about 300 to about 3000 and having viscosities in the range of about 4 to about 5500 centistokes at 100° C. are commercially manufactured by Friedel-Crafts polymerization of feeds comprising $C_3$ to $C_5$ hydrocarbons and have a wide variety of commercial applications. A principal use is as reactive intermediates in the manufacture of hydrocarbon soluble petroleum additives.

The derivatives of particular interest in the present invention are the polyalkenyl-substituted intramolecular anhydrides of aliphatic dicarboxylic acids. For example, petroleum additive products derived from polybutenyl-substituted saturated aliphatic anhydrides can be added to fuels to inhibit rusting, carburetor deposits, and carburetor icing, corrosion and smoke, and to oils as rust inhibitors, wear inhibitors, dispersants, and VI improvers.

Addition reactions between the viscous polyalkenes and intramolecular anhydrides of unsaturated aliphatic dicarboxylic acid can typically use any one of maleic anhydride, citraconic anhydride, itaconic anhydride, ethyl maleic anhydride, halo (e.g., chloro-) maleic anhydride, glutaconic anhydride, homoesaconic anhydride, and the like according to U.S. Pat. Nos. 2,628,942 and 2,634,256, among others. The addition reactions are, in general, conducted at temperatures in the range of 150° to 300° C. using polyalkene to anhydride molar ratios of reactants in the range of 1.0:1.0–15.

A known problem frequently encountered in the above-mentioned addition reaction is thermal decomposition and polymerization of the unsaturated anhydride reactant at temperatures above about 150° C. See, e.g., U.S. Pat. No. 3,476,774. Such thermal decomposition in accompanied by evolution of water vapor and oxides of carbon, in a closed reaction vessel, is accompanied by an increase in internal pressure. Under some observed conditions the thermal decomposition can be so rapid as to be explosive. In the absence of explosive thermal decomposition a carbon containing tarry residue is also formed in addition to water vapor and oxides of carbon. Such residue is due to the fact that the anhydrides can react with the water to form the dicarboxylic acids and then isomerize to the trans form (which is insoluble in the system) or to polymerize. Such thermal decomposition and attendant isomerization or polymerization of the unsaturated anhydride reactant has been observed as occurring during its addition reaction with polymeric olefins, e.g. polybutenes and others, in a closed reaction vessel. The carbon-containing residue varies in nature from somewhat granular when the decomposition is only slight to a tarry material mainly adhering to internal surfaces of the reaction vessel when the decomposition is more extensive but well below explosive magnitude. The granular type residue amounts to from about 0.1 to about 0.3 weight percent of the total charge and is generally dispersed in the alkenyl-substituted saturated anhydride addition compound product diluted with unreacted components of the olefin polymer, and is readily separated therefrom by filtration. However, the tarry residual product, which for the most part fouls the internals of the reaction vessel can be as high as 2–3 weight percent of the total charge. The tarry material not adhering to the internal surfaces of the reactor fouls the filter and interferes with filtration of the desired reaction product. Both types of residue are undesirable because of the above noted fouling characteristics and because their formation results in yield reduction of the desired alkenyl-substituted anhydride addition product.

The patent literature discloses a number of compositions and methods which improve yield in the reaction of unsaturated dicarboxylic acid anhydrides (e.g. maleic anhydride), and propene or butene polymers by inhibiting the formation of tarry residual material and undesirable reaction side products which occur because of the above-described thermal decomposition and attendant isomerization or polymerization of the anhydride reactant.

For example, Powell U.S. Pat. No. 4,414,397 discloses reaction of maleic anhydride and polyisobutylene in the presence of 1,3-dibromo-5,5-dialkylhydantoin wherein the rate of addition of the maleic anhydride to the reaction mixture is controlled such that the anhydride is present in an amount less than about its maximum solubility in the reaction mixture in order to maintain the reaction mixture as a substantially homogeneous single phase system. The controlled anhydride addition stems from the patentee's conclusion that presence of a two phase system containing undissolved anhydride "is correlative with production of undesirable sludge or tar with resulting lower yield of desired product" (column 3, lines 7–19). The patent discloses several embodiments for achieving the desired controlled addition of maleic anhydride such as by the addition of equal or varying aliquots of the anhydride over the course of the reaction (column 4, lines 13–57).

Powell U.S. Pat Nos. 4,496,746 and 4,434,071 are also directed to reducing by-product formation in the reaction of maleic anhydride with polyisobutylene. The '071 patent discloses, as a catalyst, a complex of polyisobutylene and a 1,3-dibromo dialkylhydantoin which is stated to reduce by-product formation. The '746 patent discloses addition of maleic anhydride in the form of a dispersion or emulsion in a carrier fluid to minimize sludge formation. At column 5, lines 16–23 of the '746 patent it is stated:

"In the preferred embodiment, the olefin oligomer is added to the reaction vessel and the dispersion of the maleic anhydride is added thereafter. Although it is possible to add the dispersion to the reaction mixture in one aliquot, it is preferred to add it to the reaction mixture in one aliquot, it is preferred to add it to the reaction mixture gradually over the course of the reaction. When catalyst is employed [such as a brominated dialkylhydantoin referred to at column 4 line 33] it may be added with the oligomer or with the maleic anhydride or both."

Of additional relevance to the present invention in view of their disclosures of tar and side product suppressing agents are Cengel et al. U.S. Pat. Nos. 3,927,041; 3,935,249; 3,953,475; 3,954,812; 3,960,900; 3,985,672; 4,008,168; and 4,086,251. The '041 and '672 patents disclose 1,3-dibromo-5,5-dialkylhydantoins as tar and side product inhibiting compounds. The '812 and '168 patents disclose halogenated carboxylic or sulfonic acids as tar suppressants. The '900 patents discloses halogenated aliphatic or aromatic hydrocarbons as tar suppressants. The '475 discloses halogenated aliphatic or aromatic carbonyls for tar and by-product suppression, and the '249 patent discloses inorganic halogen compounds for tar suppression. The '251 patent discloses all of the above suppressants in a method for preparing polyalkenyl substituted anhydrides where unreacted maleic anhydride is recycled to the reaction mixture.

In addition to the patents mentioned above which address the problem of reduced yields in the reaction of maleic anhydride and polyalkenes due to tar and by-product formation, it is, of course, also possible to increase the yield of the preferred polyisobutenyl succinic anhydride (PIBSA) by simply increasing the mole ratio of anhydride to polybutene in the reaction. However, this approach leads to a lower equivalent weight PIBSA which is undesirable in certain applications.

Although the patents cited above address PIBSA yield improvement without need for increased ratios of maleic anhydride to polybutene in the reaction mixture, there is still need for improvement in the reduction of by-product formation in the preparation of alkenyl substituted anhydrides wherein a tar and side product suppressing agent is used.

A general object of the present invention is therefore to provide an improved method for the manufacture of alkenyl-substituted anhydrides, other objects being evident hereinafter to those skilled in the art.

SUMMARY OF THE INVENTION

I have now discovered, in a process for preparing alkenyl-substituted anhydrides by reacting a polymer of a $C_2$ to $C_8$ olefin having a number average molecular weight of about 250–30,000 with an unsaturated aliphatic dicarboxylic acid anhydride in a reaction zone in which there is also present a tar and side product suppressing agent, wherein, the improvement step of charging said tar and side product suppressing composition to the reaction zone in a plurality of discrete stages, whereby there is achieved a reduction in unwanted tar and side products, with attendant increases in the yield of desired alkenyl substituted anhydride, surpassing that which is possible using the techniques of the prior art, which, to the best of my knowledge, utilize a single charge of tar and side product suppressing agent. Preferably, both the suppressing agent and the anhydride reactant are charged to the reaction zone in multiple stages to obtain a maximum enhancement in tar and by-product suppression.

A principle advantage of the present invention is greater overall conversion of reactants to the desired alkenyl-substituted anhydrides without need for increasing the molar ratio of anhydride to polyalkene in the reaction mixture. Other things being equal, the ability to maximize conversion of the reactants to the desired polyalkenyl substituted anhydride, while maintaining a relatively low molar ratio of maleic anhydride to polyalkene, preferably in the range of about 1-2:1, favors the production of higher equivalent weight PIBSA which may be preferred in certain petroleum additive applications.

DETAILED DESCRIPTION

Briefly, the process of the present invention, is carried out by reacting one mole of polymeric alkene based on $C_2$–$C_8$ olefin and having a number average molecular weight of from about 200 to about 30,000 with about 0.8 to about 10 moles of an unsaturated aliphatic dicarboxylic acid anhydride. An effective amount, preferably about 5 to 500 ppm based on the weight of polymer, of one or more "tar and side product suppressing agents" (defined in detail below) are introduced into the reaction zone in a plurality of stages or aliquots. The materials can be reacted at a temperature of from about 150° C. to about 300° C: to form polyalkenyl-substituted anhydride. Preferably, using a batch process, the anhydride reactant is also introduced into the reaction zone in separate aliquots over the course of the reaction.

The polymeric alkenes preferred for use in the present invention are propene or butene polymers having a number average molecular weight of from about 200 to about 3000 produced by commercial well known polymerization techniques. Particularly preferred becasue of commercial availability are polybutenes having number average molecular weights of about 600 to about 3000.

Unsaturated aliphatic dicarboxylic acid anhydrides which may be employed in the process of the present invention may be intramolecular anhydrides such as maleic, citraconic, itaconic, ethylmaleic, halomaleic, etc. The preferred anhydride is maleic anhydride, whereby the product obtained upon reaction thereof with polybutene is polybutenylsuccinic anhydride commonly referred to as "PIBSA".

The "tar and side product suppressing additives" inhibit the formation of tarry residual material and undesirable reaction side products of maleic anhydride and/or improve yield in the reaction of maleic anhydride with propene or butene polymers, having a molecular weight from about 200 to about 3000, at a temperature from about 150° C. to about 300° C. when said additives are present during the reaction between the polymer and the anhydride at a concentration of 5 to 550 ppm based on polymer. The mechanism by which these additives function is not well understood and shall not be speculated upon at this time. But it is known that many of the additives decompose during the alkene-anhydride reaction and may provide small amounts of halogen or halogen radical in the reaction mixture. These additives are high effective when incorporated into the reaction mixture at a concentration from about 5 to about 500 ppm based on polyolefin. While higher concentrations may also be effective, it is unnecessary to add more than about 5 to about 500 ppm additive. The nature and use of certain of these types of additives are described in Cengel et al. U.S. Pat. Nos. 3,927,041; 3,935,249; 3,954,812; 3,953,475; 3,960,900; 3,985,672 and 4,008,168 all of which are incorporated herein by reference.

A number of different types of compounds are effective as "tar and side product suppressing additives". One type is chlorinated and/or brominated aliphatic hydrocarbons or their halogenated derivatives. Such aliphatic hydrocarbons may be alkane, alkene, alkyne, or mixtures thereof. Typical, but not all inclusive of such compounds are:

Cl and/or Br-containing aliphatic hydrocarbons such as ethyl bromide, n-propyl chloride, n- and isopropyl bromide, methylene chloride, methylene bromide, chloroform, bromoform, carbon tetrachloride, carbon tetrabromide, ethylene chloride, ethylene bromide, ethylidene chloride, ethylidene bromide, bromochloroethane, trichloroethane, tribromoethane, tetrachloroethane, tetrabromoethane, bromotrichloromethane, bromotrichloroethane, dibromodichloroethane, tetrachloroethylene, trichlorobutanes, tribromobutanes, bromochlorobutanes, bromobutanes, dibromobutanes, dibromochlorobutanes, dichlorobromobutanes, hexachloropropene, and others.

Another type of "tar and side product suppressing additive" is chlorine and/or bromine containing derivatives of carboxylic or sulfonic acids, or N-chloro or N-bromo amides or imides of such acids. Typical, but not all inclusive of such compounds are:

chloracetic acid, acetyl chloride, chloroacetyl chloride, N-chloroacetamide, bromoacetic acid, acetyl bromide, N-bromoacetamide, N-bromo-bromoacetamide, adipyl chloride, adipyl bromide, sebacyl chloride, sebacyl bromide, alpha-chloroadipic acid, alpha-bromoadipic acid, N-bromo-adipamide, alpha-chloroadipoyl chloride, alpha-bromadipoyl bromide, 2-bromostearic acid, N-bromostearamide, maleyl dibromide, N-bromosuccinicimide, benzoyl chloride, benzoyl bromide, toluoyl chloride, toluoyl bromide, N-bromobenzamide, N-chlorophthalimide, N-bromophthalimide, $N_1$, $N_2$-dibromoterephthalamide, benzenesulfonyl chloride, benzenesulfonyl bromides, N-bromobenzenesulfonamide, toluenesulfonyl chlorides, toluenesulfonyl bromides, N-chlorotoluenesulfonamides, N-bromotoluenesulfonamides, and the like.

Another type of "tar and side product suppressing additive" is chlorinated and/or brominated intramolecular anhydrides of aliphatic carboxylic acids such as chloromaleic anhydride, bromomaleic anhydride and bromosuccinic anhydride, and others.

Still another type of "tar and side product suppressing additive" is chlorinated and/or brominated aliphatic or aromatic ketones and acetals. Typical but not all inclusive of such compounds are:

(A) The halo-ketones such as alpha-chloro or bromo ketones and di(alpha-chloro- or bromo) ketones. The former include mono, di- and tri-alpha chloro- or bromo-acetone; mono- and di-alpha chloro- or bromo-acetone; mono- and di-alpha chloro- or bromo-methylethyl ketone, di-ethyl ketone, methylpropyl ketone, ethylpropyl ketone, ethylisopropyl ketone, diisopropyl ketone, di-n-propyl ketone, methyl n-butyl ketone, ethyl isobutyl ketone, methyl tertbutyl ketone, n-butyl isopropyl ketone, n-propyl isobutyl ketone, n-propyl tertbutyl ketone, di-n-butyl ketone, diisobutyl ketone, etc. of the symmetrical and mixed alkyl ketones having in addition to the keto carbonyl carbon up to a total of twenty carbon atoms. The alpha-chloro- or bromo-alkyl diketones are those having two keto-carbonyl carbons in a chain of carbon atoms which are otherwise alkyl as in a chain of 4 to 22 carbon atoms wherein the chlorine or bromine atom or atoms is attached to a chain carbon adjacent to a keto carbonyl carbon. Such alpha chloro- or bromo-diketones are illustrated by 1,4-dichloro or dibromo-2,3-butanedione; 1,5-dichloro or dibromo-3,3-dimethyl-2,4-pentanedione; 2,6-chloro or dibromo-3,3-dimethyl-3,5-hexanedione; 2,6-dichloro or dibromo-4,4-dimethyl-3,5-heptanedione; 1,4-dichloro or dibromo-2,3-pentanedione; 2,5-dichloro- or dibromo-3,4-hexanedione, and the like. The alpha-chloro- or bromo aromatic ketones are preferably mixed alkyl aryl ketones with the chlorine or bromine on the alpha alkyl carbon as in alpha-chloro or alpha-bromo acetonaphthone, and the like.

(B) The alpha-chloro or alpha-bromo acetals such as $C_1$–$C_{10}$ dialkyl acetals of alpha-chloro- or alpha-bromoacetaldehyde because the acetaldehyde acetals are more available than acetals of other aldehydes. Of such alpha-chloro or alpha-bromo-acetaldehydes, diethyl acetals are most preferred.

Still another type of "tar and side product suppressing additive" is 1,3 dibromo-5,5-dialkyl substituted hydantoin. A typical example of such has methyl or ethyl alkyl groups. These are derivatives of hydantoic acid which is a carboxylic acid.

Still another type of "tar and side product suppressing additive" is the group of inorganic acids and salts consisting of dry halogen chloride, calcium bromide and iodine mono chloride, etc.

Still another type of "tar and side product suppressing additive" is the group consisting of chlorine, bromine and iodine.

Still another type of "tar and side product suppressing agent" is the group of boron compounds as disclosed in commonly assigned U.S. Ser. No. 551,181 now U.S. Pat. No. 4,736,044 (incorporated herein by reference) such as boric acid, boric acid salts such as ammonium borate, amine salts of boric acid, sodium borate, potassium borate, calcium borate, magnesium borate, meta borates, etc., boron oxides such as $B_2O_3$, etc., boron salts such as boron arsenate, borohydride compounds such as diborane, dihydrotetraborane, pentaborane, hexaborane, organo boron compounds such as trialkyl borate or trialkoxy boron, for example trimethyl borate, triethylborate, diethyl propyl borate, triisopropyl borate, tri-t-butyl borate, tridecyl borate, etc, and other organo boron compounds such as aryl boronic acids, triaryl boroxene, trimethyl-borane, amino-borane compounds, and borazene.

Further examples of "tar and side product suppressing additives" suitable in the present invention are:

(a) 1,3-dibromo-5,5-dialkyl-substituted hydantoin wherein the alkyl-substituents have a total of 2 to 21 carbon atoms, such as 1,3-dibromo-5,5-dimethyl-hydantoin;

(b) dry hydrogen chloride or calcium bromide;

(c) aliphatic hydrocarbon containing chlorine, bromine or chlorine and bromine, such as tetrabromomethane or bromotrichloromethane, or chlorinated or brominated polybutene;

(d) acetyle bromide, bromacetyl bromide, benzoyl bromide, N-bromo succinimide, or mixtures thereof; and (e) alpha-bromo dialkyl ketone having in addition to the keto-carbonyl carbon atom up to a total of twenty carbon atoms, alpha-dibromo-substituted alkyl diketone wherein its two-keto-carbonyl carbon atoms are in a chain of from 4 to 22 carbon atoms and each bromo-substituent is on a chain carbon atom and adjacent to a keto-carbonyl carbon atom, or alpha-bromo aceto-phenone or napthone, or $C_1$–$C_{10}$ dialkyl acetal of alpha-bromo acetaldehyde which additive has a normal boiling point in the range of from about 40° C. to about 225° C., such as 1,4-dibromo-2,3-butanedione.

Especially preferred "tar and side product suppressing additives" are N-bromosuccinimide, bromotrichloromethane, N-bromoacetamide and 1,3-dibromo-5,5-dimethylhydantoin. Other preferred additives are α-bromoacetophenone, and 1,4 dibromo-2,3-butanedione. Two or more side product suppressants may be used.

Often it is desirable to minimize the contamination of the substituted anhydride product with the "tar and side product suppressing additive" or its reaction decomposition products. This can be achieved by using a "tar and side product suppressing additive" which can/or whose reaction decomposition products can be removed by distillation at a pressure of 5 to 760 mm Hg. To be most readily removable with unreacted unsaturated anhydride, the side product suppressant or its reaction decomposition products should have a boiling point between 40°–300° C. at atmospheric pressure.

In somewhat greater detail, the reaction between the polyalkene and the dicarboxylic acid anhydride compound is carried out in standard commercial well-known procedures. The art recognizes both batchwise reaction or continuous reaction in stirred tanks, pressurized reactors, continuous reaction zones, or other equivalent reaction vessels to provide intimate contact between the reactants.

For batchwise operation the reactants are charged to the closed reaction vessel with or without an inert (oxygen-free) atmosphere at ambient or elevated pressure. The reactants can be added to the vessel at ambient temperature. However, the polyalkene can be used at an elevated temperature to reduce the time for reaction and to reduce viscosity. The anhydride reactant can be charged in solid form or dispersed in a portion of the unsaturated hydrocarbon or can be heated and added to the reactant mixture as a melt. During the reaction the mixture is stirred while the reaction temperature is controlled. Convenient conduct of the reaction can be maintained by charging to the reaction vessel a melt of the anhydride compound and preheated polymer so that the combined reactants provide sufficient heat to drive the reaction. At the end of the reaction, excess anhydride compound can be removed by distillation. The product which can be filtered and used. Reaction time for batchwise operation can be 4 to 24 hours and greater.

In continuous operation, ambient or heated streams of the dicarboxylic acid compound and unsaturated hydrocarbon can be charged to one end of a horizontal or vertical reaction zone. The reactants can be intimately contacted within the zone for a sufficient time at a sufficient temperature and pressure. The product can be withdrawn from the zone to appropriate strippers and filters. In order to maximize conversions of the reactant and to minimize formation of solid or tarry or resinous degradation products, the reaction can be carried out with a continuous anhydride reflux. The reflux rate can be in slight excess of the reaction requirements for the dicarboxylic acid compound. In this way the reaction solution is kept saturated with the anhydride compound throughout the reaction. Any anhydride compound in excess over that required to saturate the reaction zone continuously distills from the reaction zone overhead avoiding the appearance of separate anhydride compound phase in the reactor and the consequent contamination of the reaction product. The reduction in the concentration of the anhydride also reduces the products of degradation. The unsaturated hydrocarbon feed can also be controlled so that the rate of reflux and the feed rate of the unsaturated hydrocarbon are balanced to match the stoichiometric ratio of reactants. In continuous operation a shorter residence time is possible, for example, 1 to 8 hours.

The tar and side product suppressing agent can be present in the reaction at a concentration of about 1 to about 100,000 parts per million of weight of polyalkene and preferably about 100 to 500 ppm.

In accordance with the improvement step of the present invention, the total amount of tar and side product suppressing agent intended for co-reaction with the anhydride and polyalkene reactants is introduced to the reaction zone in a plurality of separate aliquots spaced over the course of the reaction.

Preferably, using a batch process, both the anhydride reactant and the tar and side product suppressing agent can be added to the reaction zone containing polyalkene in multiple stages, whereby a portion of the tar and side product suppressing agent, preferably about 30 to 60% of the total amount intended for use in the reaction is initially charged at once to the reaction zone at the beginning of the reaction, and about 50 to about 75% of the total anhydride intended for the reaction is likewise initially charged, preferably over a period of about 1 to 3 hours, to the reaction, after which the reaction is allowed to proceed for about 2 to 7 horus. After this initial reaction period the remaining tar and side product suppressant is added at once, and the remaining anhydride is charged over a 1 to 3 hour period, following which the reaction is carried out to completion. If desired, the anhydride reactant can be added in a single stage, quickly, or over a 1 to 10 hour continuous metered addition.

The multiple stage addition of the tar and side product suppressing agent according to the present invention can also be employed where the reaction of the anhydride and the polyalkene is carried out continuously be charging to the reaction vessel a melt of the anhydride reactant and polymeric alkene. Similar to the batch process summarized above, a portion of the tar and side product suppressing agent is present initially, and then additional separate aliquots can be added during the course of the reaction.

The following examples are illustrative and should not be construed as limiting the scope of the invention.

EXAMPLE I

Charge 580 grams of polybutene having a number average molecular weight of about 2068 to a one liter resin kettle and heat to 221° C. under nitrogen sparge. Into the kettle charge an initial aliquot of 0.12 g 1,3-dibromo-5,5-dialkylhydantoin (DBH). Over a 2 hour period meter 29.1 g of maleic anhydride into the kettle and react the mixture at 221° C. for 4 hours under reflux. Charge a second aliquot of 0.11 g DBH at once and meter a second charge of 12.5 g maleic over a 1 hour period into the reaction kettle and react further for 15 hours under reflux at 221° C. Cool the reaction mixture to 198° C. and reflux under 5" vacuum for 1 hour. Strip under 28" Hg vacuum for 2 hours. The reaction product is bright and clear and has the following analyses: % PIBSA in the product is 70.3; ASTM color is >5.5; 100° C. viscosity is 1240 cSt; equivalent weight is 1,814.

EXAMPLE II

The basic procedure of Example I using a multiple (50/50) DBH charge was compared to the same procedure using a single charge of DBH at the beginning of the reaction. The results set forth in Table I below demonstrate increased conversion to PIBSA afforded by the multiple DBH charge of the present invention.

TABLE I

| Molar Ratio MAN: PIB | Total DBH Charge, PPM | DBH Charge Method | % PIBSA In Product | Equiv. Wt. |
|---|---|---|---|---|
| 1.5 | 200 | Single | 65.1 | 1,690 |
| 1.5 | 200 | Multiple (50/50) | 70.8 | 1,800 |
| 1.5 | 400 | Single | 68.7 | 1,726 |
| 1.5 | 400 | Multiple (50/50) | 71.1 | 1,800 |
| 1.5 | 400 | Single | 69.0 | 1,962 |
| 1.5 | 400 | Multiple (50/50) | 70.3 | 1,814 |

I claim:

1. A process in which a polymer of a $C_2$–$C_8$ olefin having a number average molecular weight of about 250 to 30,000 undergoes reaction with an unsaturated aliphatic dicarboxylic acid anhydride in two stages in the presence of 5–500 ppm, based on said polymer, of a tar and side product suppressing agent to form an alkenylsubstituted anhydride, said process having a first stage comprising the following steps: (1) charging to a reaction zone said olefin polymer; (2) heating same to a reaction temperature of about 150° C. to about 300° C.; (3) charging about 30 to about 60 weight percent of the total amount of tar and side product suppressing agent intended for use in the reaction; (4) charging said anhydride to the heated reaction zone gradually over a period of about 1 to 3 hours and in an amount in the range of about 50 to about 75 weight percent of the total amount of anhydride intended for the reaction while maintaining said reaction temperature; and (5) allowing the reaction of the anhydride and polymer to proceed at said reaction temperature for a period of about 2 to 7 hours following completion of said anhydride addition; followed by a second stage comprising the steps of: (1) charging the remaining tar and side product suppressing agent to the reaction zone; (2) charging the remaining anhydride to the reaction zone gradually over a 1 to 3 hour period; and (3) allowing the reaction of the anhydride and polymer to proceed to completion.

2. The process of claim 1 wherein the olefin polymer is polybutene having a number average molecular weight of from about 600 to about 3000 and wherein the anhydride is maleic anhydride.

3. The process of claim 2 wherein the tar and side product suppressing additive is 1,3-dibromo-5,5-dimethyl hydantoin.

* * * * *